Sept. 1, 1970     E. H. MANUEL ET AL     3,526,027
APPARATUS FOR COATING SIDE SEAM AREAS OF CONTAINERS
Filed May 29, 1967
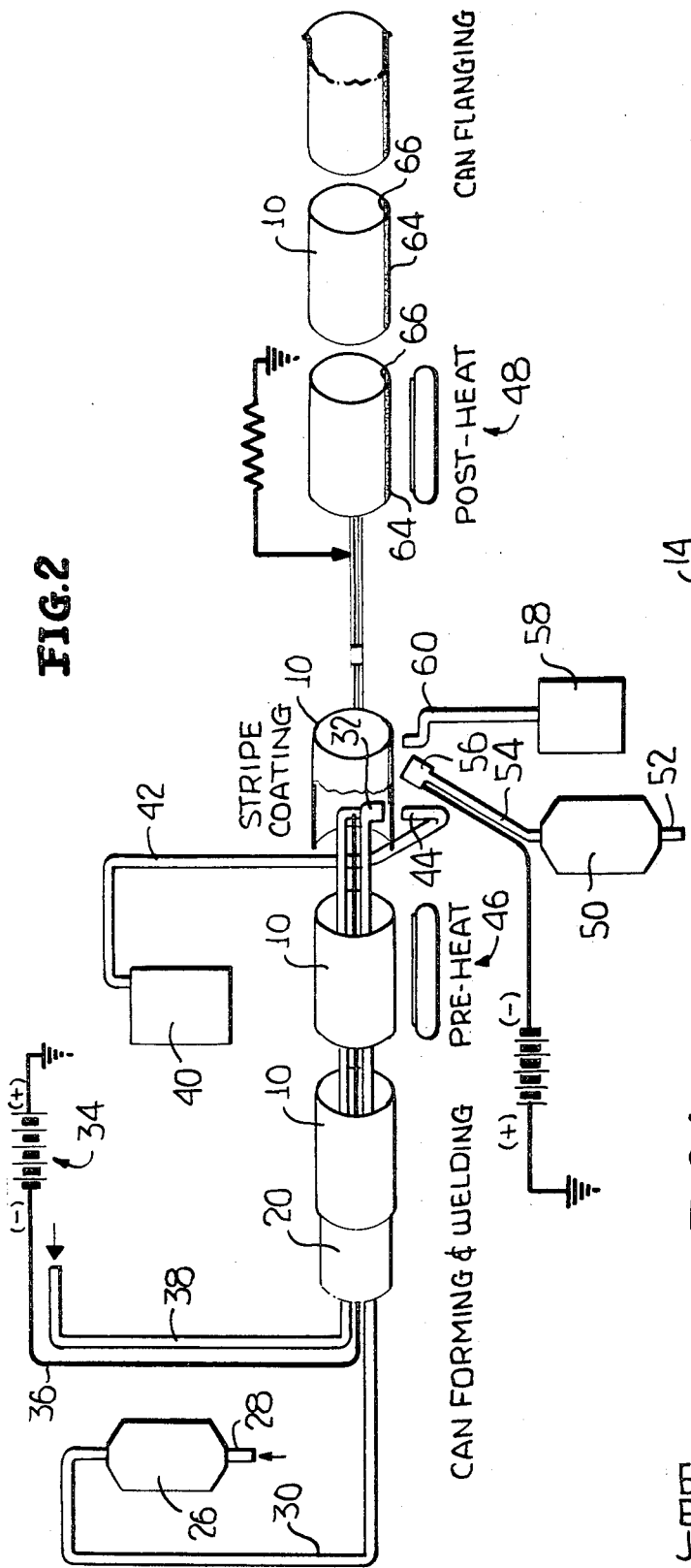
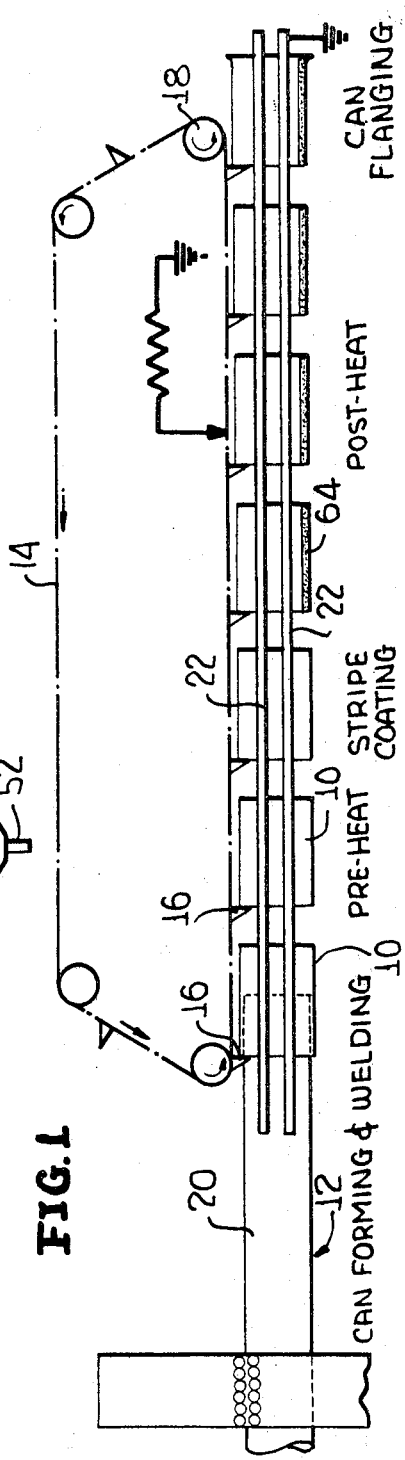
INVENTORS
ERNESTO H. MANUEL,
EDWARD D. HIGGINS &
JAMES G. BUCK
BY Mason, Porter, Diller & Brown
ATTORNEYS United States Patent Office 3,526,027
Patented Sept. 1, 1970

3,526,027
APPARATUS FOR COATING SIDE SEAM AREAS OF CONTAINERS
Ernesto H. Manuel, Park Forest, Edward D. Higgins, Palos Heights, and James G. Buck, Western Springs, Ill., assignors to Continental Can Company, Inc., New York, N.Y., a corporation of New York
Filed May 29, 1967, Ser. No. 641,980
Int. Cl. B05b 5/02, 13/06; B23p 19/00
U.S. Cl. 29—200                               5 Claims

ABSTRACT OF THE DISCLOSURE

Apparatus for coating side seam areas of formed metal containers by fusing of polymer resin powders on the inside and/or outside seam areas. Vacuum means are provided exteriorly of the containers for the recovery of overspray powder and powder blowing out of nozzles when no container bodies are going through the powder dispensing section of the apparatus.

BACKGROUND OF THE INVENTION

Field of the invention

The invention relates to the art of manufacturing container bodies and is particularly concerned with coating seams of such container bodies in order to preclude leakage and in order to protect contents of the containers against contamination.

Description of the prior art

The present production method of side stripe coating involves spray application of a solvent-based enamel system normally 40–50% solids and fusing the enamel by solvent evaporation through external heating. While it is well known that such technique has been employed successfully for many years, it has certain limitations particularly in the areas of (1) efficiency of material utilization, (2) limitations on the amount of coating material that can be applied, and (3) control of atmospheric air pollution, all of which are directly or indirectly related to the organic solvent present in the enamel system.

SUMMARY OF THE INVENTION

The apparatus defined by the present invention offer unique advantages in that (1) no organic solvent is involved, (2) almost 100% conversion of the applied resin powder to coating is obtained, (3) material losses are minimum since recovery and re-use of the unfused resin powder is accomplished, and (4) the application and fusing of both inside and outside stripe coating is done in one short, continuous operation. The process consists of depositing a uniform layer of dry resin powder on the side seam surface of a moving metal can body, where the powder, upon impinging, melts and fuses to form a smooth, adherent stripe coating. An air/powder mixture is directed through a nozzle toward the side seam area of a container body and is made to "stick" thereto either by heating at least a portion of the container body or by electrostatic attraction of the powder to the container body. Vacuum means are provided for the recovery of overspray powder and powder blowing out of the nozzles when no container bodies are going through the powder dispensing section of the apparatus.

BRIEF DESCRIPTION OF THE DRAWING

FIG. 1 is a schematic illustration of the preferred apparatus for moving container bodies from a can forming and welding station through a pre-heat station, into a stripe coating station, through a post-heat station and to a can flanging station.

FIG. 2 is a schematic illustration of the apparatus located at the various stations set out in the description of FIG. 1.

DESCRIPTION OF THE PREFERRED EMBODIMENTS

As is shown in FIG. 1, a plurality of metal containers 10 are moved from a conventional can forming and welding station, generally indicated by the numeral 12, by means of a conveyor chain 14 which has a series of lug members 16 spaced therealong. The conveyor chain 14 is driven by conventional means such as drive roller 18. Metal containers 10 are open-ended can bodies which are formed about a conventional horn 20 and are guided by a series of magnetic rails 22 so that the conventional welded seam is maintained in a predetermined position. For reasons which will become more apparent, the containers 10 are electrically grounded through conveyor chain 14 and magnetic rails 22.

During the manufacture of containers or can bodies 10, it is well known that such can bodies include a seam which must be coated or sealed to prevent leakage and/or product contamination. The process of the present invention consists of depositing a uniform layer of dry resin powder on the seam surface of a moving metal can body, where the powder, upon impinging, melts and fuses to form a smooth, adherent stripe coating along the seam and on areas closely adjacent thereto. As is shown in FIG. 2, a dispensing unit 26 contains dry resin powder which is fluidized by a flow of low pressure dry air being introduced through inlet port 28. The fluidized resin powder is carried through a small diameter tubing 30, through the horn 20, to a dispensing nozzle 32 which is located inside the container 10 at a stripe coating station. A power source 34 is connected by conductor 36 to a corona source inside of the nozzle 32. An air-scrubber line 38 is also connected to the nozzle 32 but does not form a part of the present invention. A vacuum source 40 has an intake line 42 which is open-ended at 44 for recovery of powder overspray and recovery of powder blowing out of nozzle 32 when no container 10 is going through the strip coating station. It is to be understood that the vacuum source 40 includes, or leads to, a powder recovery unit wherein the recovered powder is processed prior to re-use by drying the powder to remove moisture and screening the powder to remove foreign particles and agglomerated material.

In some instances, it is desirable to provide a pre-heat station 46 and a post-heat station 48. Pre-heating and post-heating of the container seam can be done by either R.F. induction heating and/or by the use of strip gas burners. Heating of the containers is confined only to the narrow seam area where the resin material is to be deposited and fused. While temperature requirements for fusing the deposited powder will vary depending on the type of powder being used and on the speed at which the can bodies are moving, it has been found preferable to maintain the pre-heat temperature in the range of 300–375° F. and post-heat temperature in the range of 375–450° F. In instances where the container seam is formed by welding, it may be possible to eliminate the pre-heat station since the residual heat from the welding operation may be sufficient to cause the resin powder to stick to the container 10 upon being emitted from nozzle 32. Also, in certain instances, the residual heat from the welding operation may permit elimination of the need for the post-heat station 48. After the container 10 is transported from the post-heat station 48, the container can then be operated upon by conventional can flanging equipment.

In order to provide a stripe coating on the outside of the container body, a second powder dispensing unit 50 is provided. Fluidizing air enters the unit 50 at inlet port 52 and causes an air-powder mixture to be carried through tubing 54 and be discharged through nozzle 56 which is located adjacent the exterior surface of the container 10. A vacuum source 58 and intake line 60 are located so as to control powder overspray and recovery of powder during the absence of a container 10. Power source 62 is connected to nozzle 56 so that the resin powder can be electrically charged by, for example, a corona discharge.

As is best shown in FIG. 2, the containers 10 are provided with an outside stripe 64 and an inside stripe 66 along a narrow band on both sides of the seam.

All of the known polymer resins can be used for this type of stripe forming provided that the resins are by wlding, it may be possible to eliminate the pre-heat available in powder form of acceptable particle size, such size being in the range of 100 microns or smaller. Examples of specific materials which have been found satisfactory to date include: epoxy resins with or without curing agents, polyethylene, polyethylene/peroxide mixtures, vinyls, polyamides, polypropylene and phenoxy powders.

The finely divided polymeric powders are fluidized by low pressure air and sprayed uniformly on the pre-heated side seam area of the moving metal can body or container 10. Fusing of the impinging powder occurs at the surface of the moving container resulting in the formation of a smooth enamel layer. To complete the cure of the fused enamel, the stripe layer is further subjected to a short post-heating cycle. The deposition of the dry powder on both the inside and outside side stripe is done in one continuous operation; the normal sequence being the application of the inside stripe followed by the outside side stripe. In either case, clear or pigmented powder may be used without impairing the sequence of the coating operation.

The density of the suspended powder particles and the degree of powder fluidization are controlled by the volume of air in the system and by mechanically vibrating the reservoir and dispensing units 26 and 50.

The deposition and fusing of the powders on the surface of the moving can bodies can be done in a variety of ways, all of which have been found satisfactory. These various ways can be briefly described as follows:

(1) The seam area of the moving can body is pre-heated to a temperature sufficient for the resin powder to "stick" and begin to flow on application, and initiate fusing of the powder which is subsequently post-baked at the post-heat section to form a hard, smooth and adherent coating. Either the inside stripe, outside stripe, or both, can be applied during this sequence. Heating of the substrates at both the pre-heat and post-heat sections can be done by using either strip gas burners or R.F. or H.F. induction coils.

(2) A sequence of operation similar to (1) whereby pre-heating of the side seam alone is utilized to fuse and cure the coating.

(3) A sequence of operation similar to (1) whereby post-heating alone of the applied powder is utilized to fuse and cure the coating.

(4) A sequence of operations described in (1) and (2) whereby the powder is applied by using air/vacuum nozzle structures.

(5) A sequence of operations described in (1), (2) and (3) whereby the powder is applied by electrostatic charging of the powder particles.

(6) A sequence of operations described in (1), (2) and (3) whereby the powder is applied by electrostatic charging of the particles coupled with the use of air/vacuum nozzle structures.

While preferred forms and arrangement of parts have been shown in illustrating the invention, and preferred methods have been disclosed for practicing the invention, it is to be clearly understood that various changes in details and arrangement of parts may be made without departing from the spirit and scope of the invention, as defined in the appended claimed subject matter.

We claim:

1. Apparatus for coating side seam areas of container bodies comprising means for forming container bodies with a welded side seam at a container forming and welding station, means for moving said container bodies from said welding station to a stripe coating station, nozzle means for directing dry powder onto the seam area on the interior surface of said container body, fusing means for causing said powder to adhere to said seam area, and powder collecting means located exteriorly of said container body for collecting overspray from said nozzle means.

2. Apparatus as in claim 1 wherein said means for moving said container bodies comprises conveyor means including lug means for engaging edge portions of said container bodies, and guide means for maintaining said welded side seams in proper position relative to said nozzle means.

3. Apparatus as in claim 2 wherein said guide means comprises a series of magnetic rails located between said welding station and said coating station.

4. Apparatus as in claim 1 including an additional nozzle means located exteriorly of said container bodies for applying dry powder onto the exterior seam area of said container bodies.

5. Apparatus as in claim 2 including a source of electric potential for electrostatically charging said dry powder, and means electrically grounding said conveyor means whereby said container bodies are grounded through contact with said lug means.

References Cited

UNITED STATES PATENTS

| 3,016,875 | 1/1962  | Ballentine et al. | 117—21 X |
| 3,291,631 | 12/1966 | Smith             | 117—18 X |
| 3,161,530 | 12/1964 | Strobel           | 117—21 X |
| 3,208,868 | 9/1965  | Strobel et al.    | 117—21 X |
| 3,394,450 | 7/1968  | Gill et al.       | 117—17 X |
| 3,422,795 | 1/1969  | Smith             | 118—308  |

PETER FELDMAN, Primary Examiner

U.S. Cl. X.R.

29—430; 117—18, 93.41; 118—308, 317, 622